United States Patent
Lehmann

(10) Patent No.: US 9,976,776 B2
(45) Date of Patent: May 22, 2018

(54) SOLAR COLLECTOR UNIT AND A METHOD OF PROVIDING SUCH A SOLAR COLLECTOR UNIT

(75) Inventor: Kim Nichum Lehmann, Fredericia (DK)

(73) Assignee: Alpha-E APS, Fredericia (DK)

( * ) Notice: Subject to any disclaimer, the term of this patent is extended or adjusted under 35 U.S.C. 154(b) by 592 days.

(21) Appl. No.: 14/240,235

(22) PCT Filed: Aug. 24, 2012

(86) PCT No.: PCT/DK2012/050308
§ 371 (c)(1),
(2), (4) Date: Jun. 10, 2014

(87) PCT Pub. No.: WO2013/026456
PCT Pub. Date: Feb. 28, 2013

(65) Prior Publication Data
US 2014/0283818 A1   Sep. 25, 2014

(30) Foreign Application Priority Data

Aug. 25, 2011   (DK) .................................. 2011 00640
May 15, 2012   (DK) .................................. 2012 70250

(51) Int. Cl.
*F24J 2/14*   (2006.01)
*F24J 2/52*   (2006.01)
(Continued)

(52) U.S. Cl.
CPC ............. *F24J 2/145* (2013.01); *F24J 2/1052* (2013.01); *F24J 2/52* (2013.01); *F24J 2/5233* (2013.01);
(Continued)

(58) Field of Classification Search
CPC ...................................... F24J 2/52; F24J 2/145
(Continued)

(56) References Cited

U.S. PATENT DOCUMENTS 4,078,549 A    3/1978  McKeen et al.
4,119,365 A *  10/1978 Powell ..................... F24J 2/145
                                                                       126/684
(Continued)

FOREIGN PATENT DOCUMENTS

EP    0134394 A2    4/1984
EP    0338051       4/1989
(Continued)

OTHER PUBLICATIONS

3M Launches 3M Solar Mirror Film 1100. Oct. 4, 2010, 3M. http://news.3m.com/press-release/company/3m-launches-3m-solar-mirror-film-1100.*
(Continued)

*Primary Examiner* — Avinash Savani
*Assistant Examiner* — Rabeeul Zuberi
(74) *Attorney, Agent, or Firm* — MKG LLC

(57) ABSTRACT

The solar collector unit is adapted for reflecting light onto a receiver, and comprises a reflector element, and a support structure supporting the reflector element. The reflector element is flexible and comprises a reflective surface and a substrate having a predefined length and width. The support structure comprises a predefined number of profiles per length unit connected to the reflector element at a distance from each other to provide a predefined shape of the solar collector unit. The number of profiles per length of substrate may be varied and lies in the interval 3 to 12, preferably 4 to 10, most preferred 5 to 8 per 2000 mm of length of the substrate.

3 Claims, 13 Drawing Sheets

(51) Int. Cl.
*F24J 2/10* (2006.01)
*F24J 2/54* (2006.01)

(52) U.S. Cl.
CPC .............. *F24J 2/5239* (2013.01); *F24J 2/541* (2013.01); *Y02B 10/20* (2013.01); *Y02E 10/45* (2013.01); *Y02E 10/47* (2013.01)

(58) Field of Classification Search
USPC .......................................................... 73/849
See application file for complete search history.

(56) References Cited

U.S. PATENT DOCUMENTS

| | | | | |
|---|---|---|---|---|
| 4,515,148 | A * | 5/1985 | Boy-Marcotte | F24J 2/145 126/570 |
| 4,571,812 | A * | 2/1986 | Gee | B21D 53/883 126/696 |
| 7,028,441 | B2 * | 4/2006 | Dahl | E04C 3/07 29/897 |
| 2006/0193066 | A1 | 8/2006 | Prueitt | |
| 2006/0213281 | A1 * | 9/2006 | Doak | G01N 3/20 73/849 |
| 2008/0167789 | A1 * | 7/2008 | Okamoto | F01L 1/047 701/105 |
| 2008/0308094 | A1 | 12/2008 | Johnston | |
| 2009/0056698 | A1 | 3/2009 | Johnson et al. | |
| 2010/0000522 | A1 | 1/2010 | Zahuranec | |
| 2010/0313933 | A1 | 12/2010 | Xu | |
| 2011/0073104 | A1 * | 3/2011 | Dopp | F24J 2/055 126/651 |
| 2011/0100358 | A1 * | 5/2011 | Perisho | F16H 19/005 126/690 |
| 2011/0108090 | A1 | 5/2011 | Lance et al. | |

FOREIGN PATENT DOCUMENTS

| | | |
|---|---|---|
| EP | 1343942 B1 | 10/2004 |
| FR | 2483064 A1 | 11/1981 |
| FR | 2516220 A1 | 5/1983 |
| WO | 2002050385 A1 | 6/2002 |
| WO | 2007087680 A1 | 8/2007 |
| WO | 2007096158 | 8/2007 |
| WO | 2008013976 A2 | 1/2008 |
| WO | 2010143050 A2 | 12/2010 |
| WO | 2012111008 A9 | 8/2012 |

OTHER PUBLICATIONS

PCT Search Report issued in corresponding International Application PCT/DK2012/050308, dated Nov. 11, 2012, pp. 1-2.
Search Report issued in corresponding Danish Application No. PA 2012 70250, dated Jan. 3, 2013, pp. 1-2.
PCT Search Report issued in corresponding International Application PCT/DK2012/050308, dated Nov. 11, 2012, pp. 1-2. 20

* cited by examiner

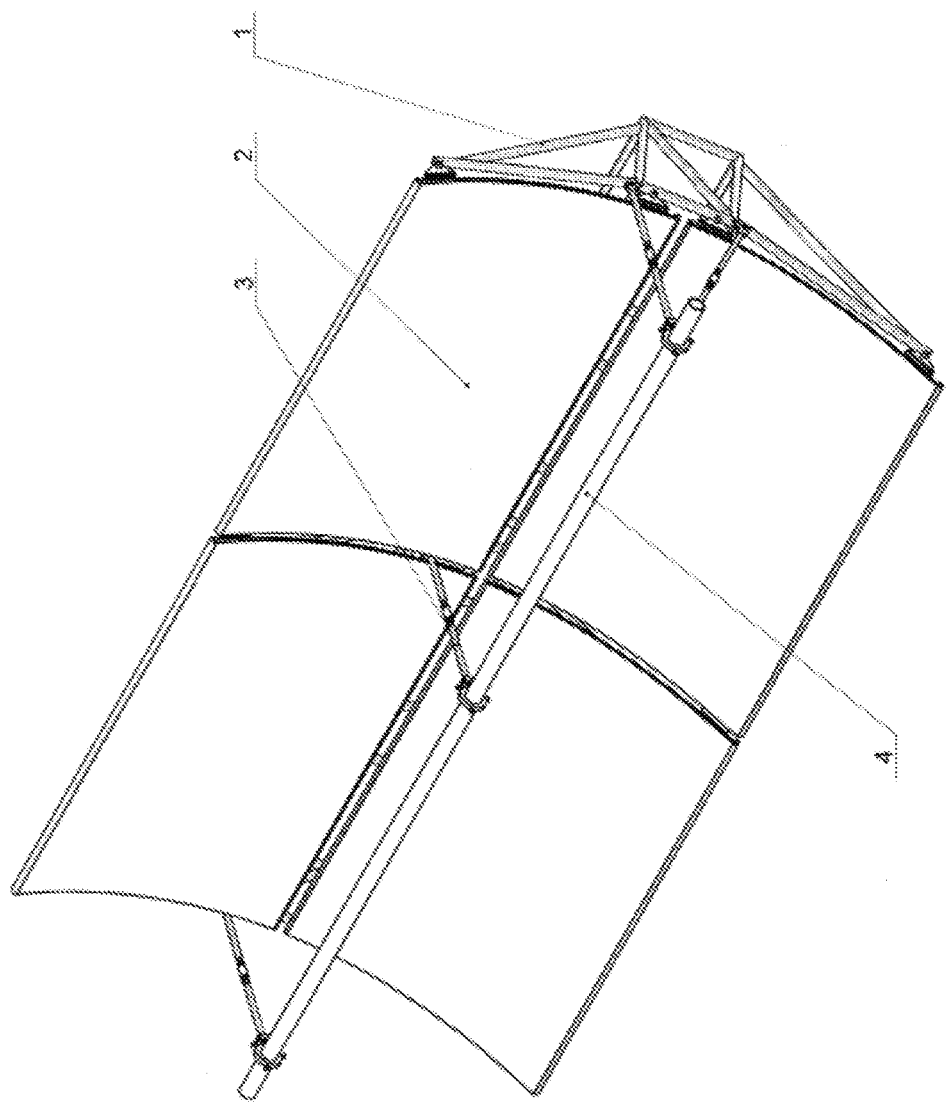
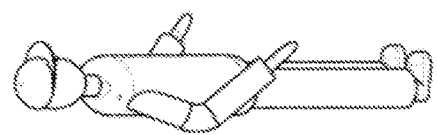
Fig. 1

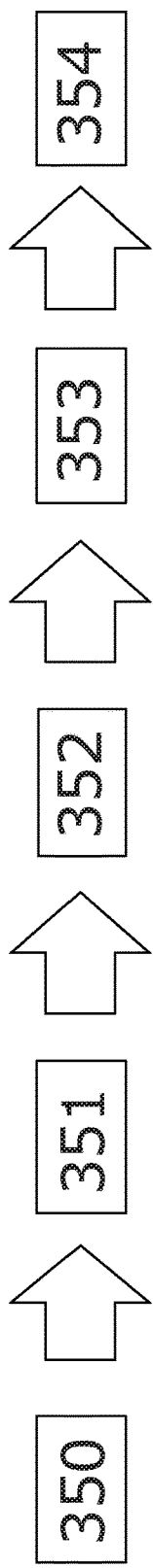

SOLAR COLLECTOR UNIT AND A METHOD OF PROVIDING SUCH A SOLAR COLLECTOR UNIT

FIELD OF THE INVENTION

The present invention relates to a solar collector unit adapted for reflecting light onto a receiver, comprising a reflector element, and a support structure supporting the reflector element. The invention furthermore relates to a method of providing such a solar collector unit.

BACKGROUND

For many years, renewable and alternative sources of energy have been explored to a large extent, and during recent years, there has been an ever increasing awareness of the overall energy generation and consumption prompted in particular by global climate change concerns and higher prices on traditional resources such as oil.

One such renewable source is solar energy. Solar energy utilizes the radiation from the sun to generate heat or power, basically either by generating electrical power directly, i.e. by converting the solar radiation into direct current electricity using photovoltaic solar panels comprising a number of solar cells containing a photovoltaic material, or by means of solar thermal collectors to utilize the thermal energy to generate heat, for instance for residential heating purposes, for evaporation of liquids (distillation) or to generate electricity by heating water or another heat transfer fluid to produce steam which in turn drives a turbine coupled to an electrical power generator.

One way of obtaining very high temperatures and thus an efficient utilization of the solar thermal energy is concentrated solar power (CSP) systems, which fundamentally use mirrors or lenses to concentrate a large area of sunlight, i.e. solar thermal energy, onto a small area. Concentrating technologies exist in four basic types, viz. solar collectors in the form of parabolic troughs, dish mirrors, concentrating linear Fresnel reflectors, and plane solar collectors directed towards a solar power tower. CSP has recently been widely commercialized and has gained a substantial market share of the renewable sources. Of the CSP plants world-wide, parabolic-trough plants account for major part.

In principle, a solar thermal energy collector comprising a parabolic trough consists of a linear parabolic reflector that concentrates radiation onto a receiver positioned along the focal line of the reflector. The receiver is a tube positioned directly above the middle of the parabolic mirror and filled with a heat transfer fluid. The parabolic trough is usually aligned on a north-south axis, and rotated to track the sun as it moves, or the trough can be aligned on an east-west axis, which reduces the need for tracking but reduces the overall efficiency of the collector.

The parabolic trough reflector is traditionally formed as an elongated parabolic mirror which is carried by a support structure. The mirror is traditionally made up of glass, which has excellent reflecting properties. However, glass has some disadvantages. For instance, it is fragile, meaning that particular precautions must be taken during manufacture, transportation and installation. Furthermore, the weight of such mirrors is substantial, which poses great demands on the support structure, and the overall costs of manufacture, transportation, installation, and maintenance of the system are relatively high.

In the prior art, attempts have been made to provide alternatives to such assemblies. Examples are shown in US published patent application No. 2010/0313933 and EP patent No. 338 051. Another example is given in for instance US published patent application No. US 2006/0193066 A1, which suggests the formation of reflective cones as an alternative to solar collectors in the form of parabolic troughs and dish mirrors. One of the advantages associated with the particular design mentioned in this document is that the considerable precision required constructing and maintaining parabolic troughs and mirror dishes may be avoided. However, the efficiency of a parabolic trough or mirror dish is considerably larger than with the solar collector suggested in this document.

In known plants, reflectors made of aluminium sheet are used to reduce weight. However, the reflecting properties of aluminium are lower than those of glass; furthermore, as such solar collectors are exposed to weathering at all times, bare aluminium needs frequent cleaning and polishing in order to retain its reflecting properties.

Document WO 2007/096158 A1 describes a self-supporting support structure in the form of hollow chamber profiles carrying on its front face a parabolic concentrator reflector. The support structure is provided as profiles that are extruded, strand-drawn or roll-formed. Although this design alleviates many of the disadvantages of other alternative assemblies, there is still room for improvement with regard to ease of production, transportation, installation and maintenance.

SUMMARY

With the aforementioned background, it is an object to provide a solar collector unit, which is more cost-effective and versatile, and which may be adapted to the particular field of use of the solar collector unit.

This and further objects are achieved by a solar collector unit of the kind mentioned in the introduction, which is furthermore characterized in that the reflector element is flexible and comprises a reflective surface and a substrate having a predefined length and width, and that the support structure comprises a predefined number of profiles per length unit connected to the reflector element at a distance from each other to provide a predefined shape of the solar collector unit.

By providing the reflector element and the support structure in such a manner, optimum versatility in manufacture and use of the solar reflector unit is achieved according to the field of use, as the properties of the solar collector unit may be varied in response to the demands posed in various fields of use. Furthermore, by a suitable choice of material, it is possible to form the solar collector unit as a light-weight, yet stable and self-supporting structure.

In another aspect of the invention, a method is provided, wherein the predefined number of profiles is selected so as to limit the deflection for a load of 20 kg to less than 25 mm when the solar collector unit is subjected to a test comprising the steps of:
  providing a substrate with a length of 2000 mm and a width of 1400 mm,
  bending each longitudinal edge of the substrate 90° with a width of 20 mm and then a further 90° with a width of 30 mm,
  positioning the solar collector unit in a measuring rig by fixating one side edge,
  loading the other side edge by a variable force,
  measuring the deflection at the opposite longitudinal edge.

Further details are described, and further advantages stated, in the description of particular embodiments of the invention.

BRIEF DESCRIPTION OF THE DRAWINGS

In the following the invention will be described in further detail by means of examples of embodiments with reference to the schematic drawings, in which FIG. 1 shows a perspective view of an embodiment of a solar collector unit according to the invention installed in a plant;

FIG. 3a shows a partial perspective view, on a larger scale, of a detail of the solar collector unit shown in FIG. 3;

FIG. 3b shows a partial perspective view, on a larger scale, corresponding to FIG. 3a of a detail of a solar collector unit in an alternative embodiment;

FIG. 13 shows a block flow diagram of a test used for selecting the number of predefined number profiles so as to limit the deflection for a load of 20 kg to less than 25 mm.

DETAILED DESCRIPTION

Figure 2:
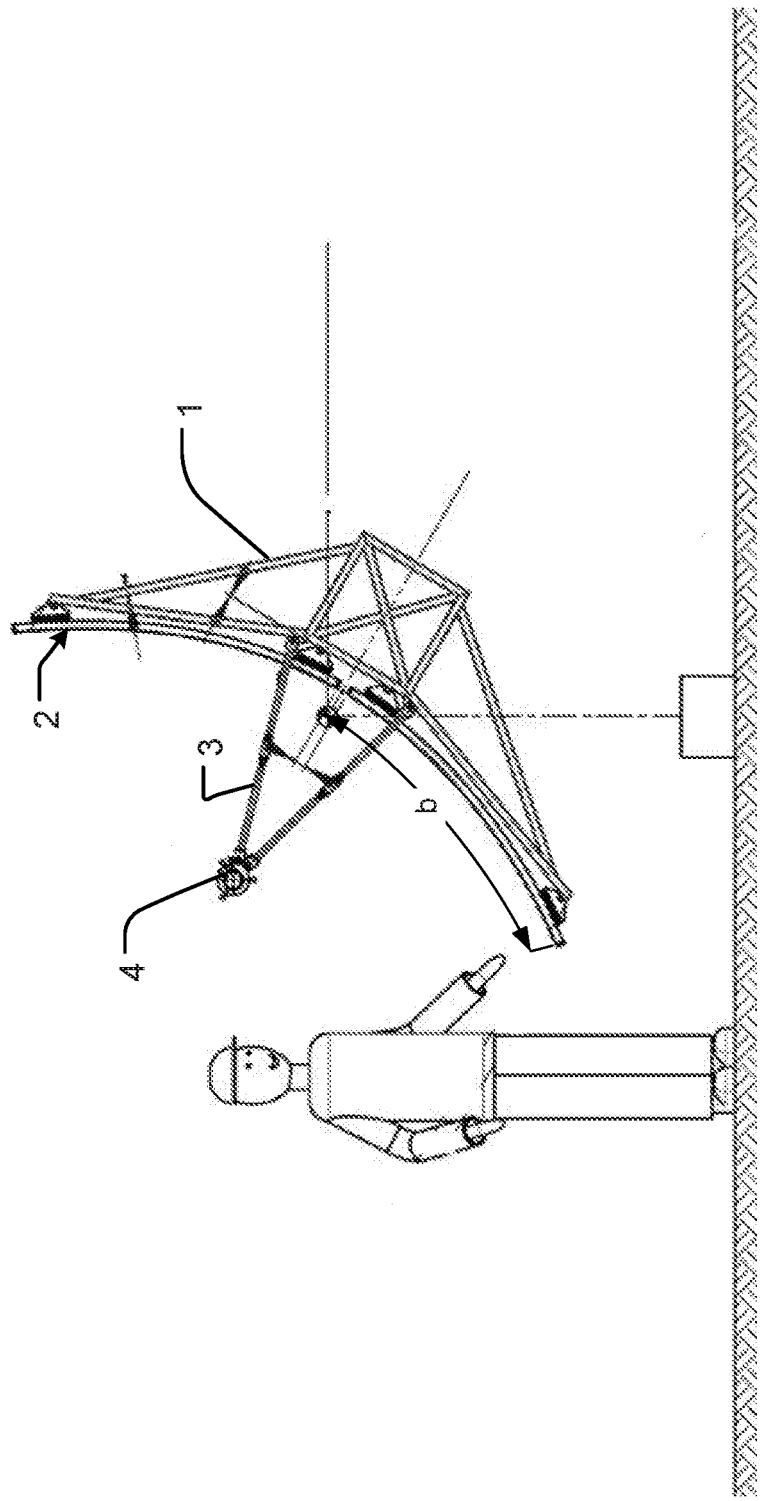
FIG. 2 shows a side view of the solar collector unit of FIG. 1.
Figure 3:
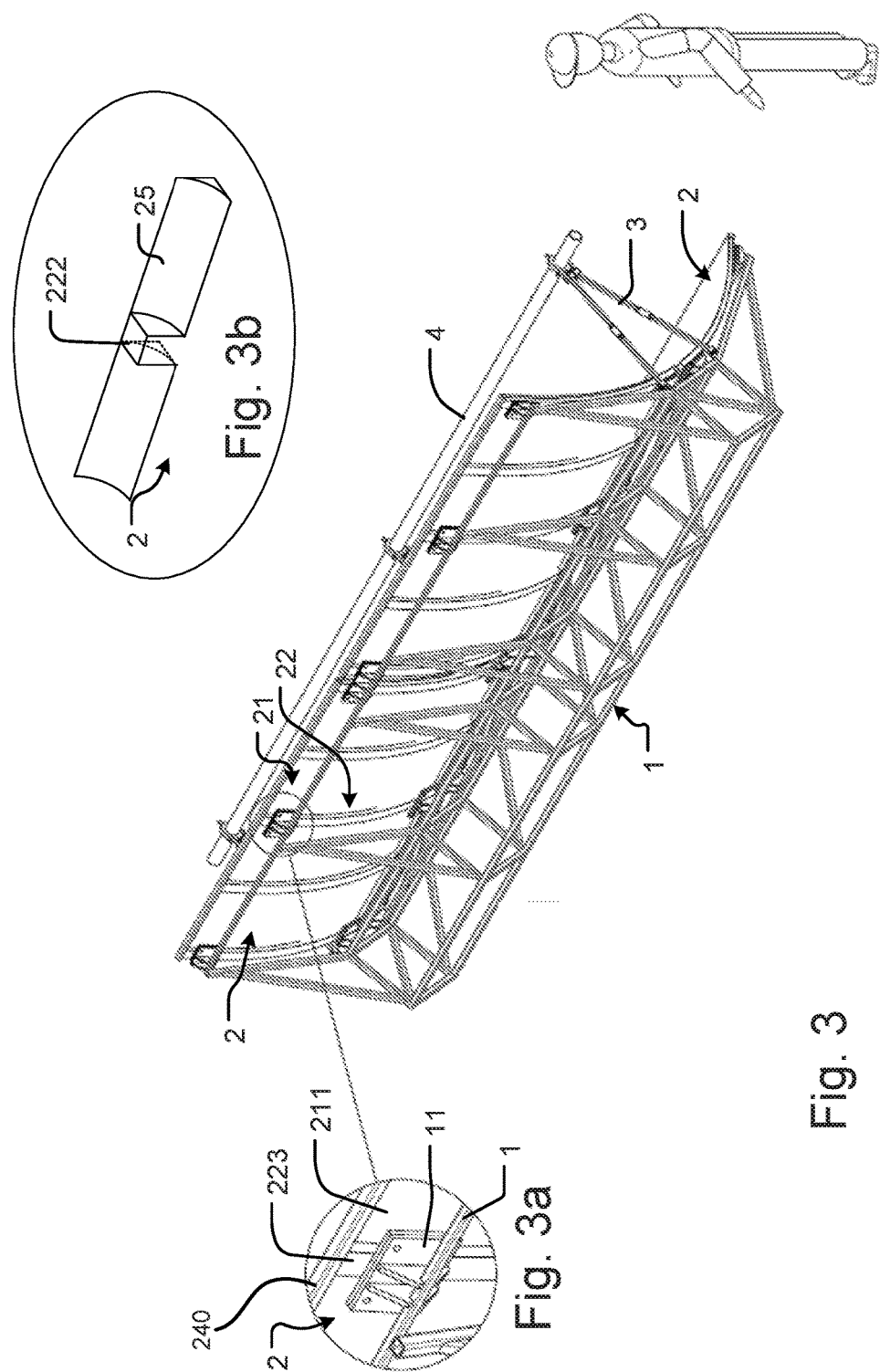
FIG. 3 shows a perspective view of the solar collector unit of FIG. 1 from another angle.
Figure 4:
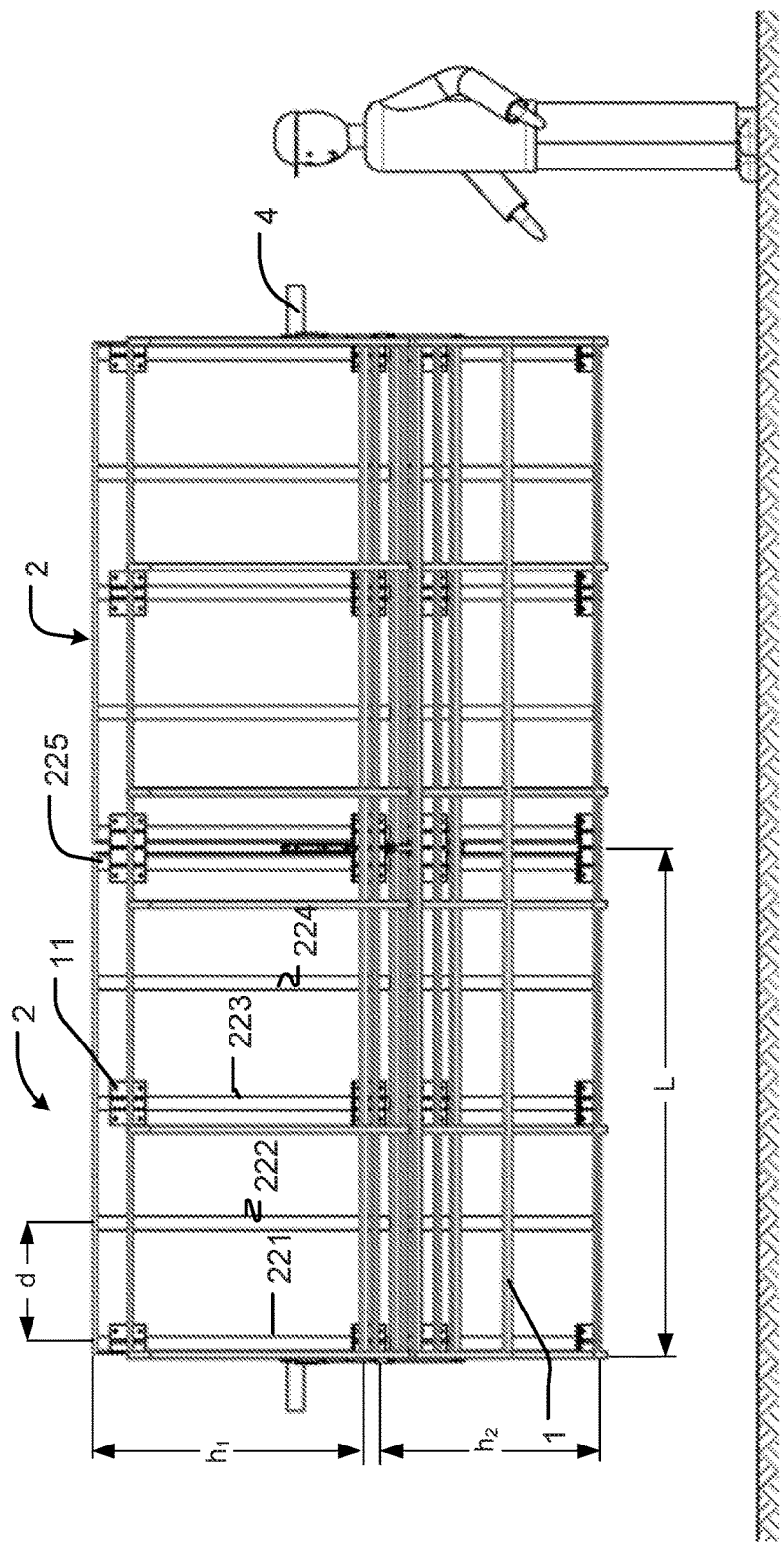
FIG. 4 shows a plan view of the solar collector unit of FIG. 1, seen from its backside.

Referring first to FIGS. 1 to 4, a solar energy plant is shown and comprises four solar collector units 2 mounted on a common carrying frame 1. Thus, in the configuration shown of the solar energy plant, two solar collector units 2 are positioned in juxtaposition to each other in the height direction and two solar collector units 2 in the length direction. In the following, only one solar collector unit 2 will be described in detail; other solar collector units of a plant may be designed in a similar or modified manner. It is also to be understood that a single solar collector unit 2 may constitute a solar energy plant in itself, for instance for the household field of use. Furthermore, the solar collector unit may also be used as a repair unit.

Each solar collector unit 2 is produced to have a predefined parabolic shape in a manner to be described in further detail below. In the configuration shown, in which two solar collector units 2 are positioned in juxtaposition in the height direction, one solar collector unit 2 thus constitutes one half of the parabola. In the focus line of the parabola, a receiver 4 is arranged and mounted to the carrying frame 1 by means of holding arms 3. The receiver 4 is adapted to accommodate a heat transfer fluid, such as water for consumption or for evaporation, in a manner known per se.

In the embodiment shown, the solar collector unit 2 comprises a reflector element 21 formed by a substrate 211 and a reflective surface (not indicated by a separate reference numeral), and a support structure generally designated 22.

The reflective surface 23 of the reflector element 21 may be provided as a coating, or as a film having reflecting properties. The film may be a multi-layer film 24, preferably having UV-protecting properties. One example of such a film is 3M™ Solar Mirror Film 1100, but other commercially available mirror-reflecting films are conceivable as well. The substrate 211 of the reflector element is advantageously formed by a flexible sheet of a metal selected from the group consisting of aluminum, magnesium and titanium or a combination thereof. Depending on the choice of material, the thickness of the metal sheet constituting the substrate 211 is advantageously less than 2.5 mm. In a preferred embodiment, the thickness lies in the interval 1.0 to 2.0 mm, most preferred 1.5 mm. The substrate 211 has a predefined length L and width b. The length L and width b of a single solar collector unit may be varied in accordance with the particular field of end use and of the transportation conditions. It is particularly advantageous that the solar collector unit may be handled manually. In general, the length L lies in the interval 1000 to 6000 mm, for example 1000-3000, 2000-4000, more specifically 1000, 2000, 3000, 4000, 5000 and 6000 mm and the width between 1000 and 3000 mm. The overall weight of the solar collector unit depends on a number of factors, such as the thickness and material of the plates and profiles, the number of profiles, the weight of the film or coating etc. Typical values of the specific weight are at least 1.5 kg/m$^2$ or less than 7 kg/m$^2$ such as in the interval 1.5 to 7 kg/m$^2$, more preferred 2.5 to 5. Thus, it is possible to produce solar collector units of a relatively large area and still maintain the easy handling and transportation of the unit.

The support structure 22 comprises a predefined number of profiles connected to the reflector element 21 at a distance from each other. In the embodiment shown in FIGS. 1 to 4, there are five such profiles numbered 221-225 positioned equidistantly from one longitudinal or side edge of the solar collector unit 2 to the other. Thus, in the case the substrate has a length of 2000 mm, the distance d is approximately 500 mm. The profiles 221 of the support structure 22 may take any suitable form and may be for instance be formed as U-shaped, I-shaped or closed rectangular profiles. Conceivable designs of the profiles include manually shapable profiles such as the commercially available Prebeam™ from the firm MDT A/S, other manually shapable profiles, rolled profiles or fixed profiles manufactured by for instance moulding or extrusion. The profiles 221-225 are connected to the substrate 211 in any suitable manner, for instance by an adhesive tape or by an adhesive, such as 3M™ Scotch-Weld EPX Epoxy Adhesive DP490. The profiles 221-225 are connected to the substrate 211 of the reflector element 21 at a mutual distance, which may for instance be equal throughout the length L of the substrate 211. The predefined number of profiles per length unit of the substrate will be described in further detail below. A more general description of the commercially available Prebeam™ is given in European patent No. EP 1 343 942 B1 and thus describes profiles formed as manually shapable structural members, and wherein each structural member has a generally U-shaped cross-section and a longitudinally extending configuration, comprising a base portion and two leg portions extending at substantially right angles from said base portion, said structural member comprising at least one corrugated portion and each leg portion including a first section forming an inner wall of the leg portion and a second section parallel with said first section and joining the first section along a first joining line and the base portion along a second joining line, wherein said structural member is formed integrally from at least one thin sheet or foil which is corrugated in a continuous waveform in the longitudinal direction of the member, and wherein the corrugations on the outer side of the structural member are partly cut in the area of the first joining line.

The entire solar collector unit 2 is connected to carrying frame 1 either by mechanical or adhesive means, or by a combination. Suitable adhesive connections include the use of for instance 3M™ Scotch-Weld™ 7271 B/A. Mechanical connection may include a clamping device 11 mounted to at least some of the profiles 221-225, as shown in the detailed drawing of FIG. 3a showing the connection between one profile 223 and the carrying frame 1. Such a clamping device is particularly advantageous in the case of I-shaped profiles, in which the clamping device may be positioned to clamp the profile as well as the carrying frame. The substrate may be kept as a plane plate formed to the desired shape and utilizing the entire surface for reflection. As one alternative, which is apparent from the embodiment shown in FIG. 3a, the longitudinal or side edge of the substrate 211 has been bent 90° with a width of the height of the profile, such as about 30 mm, and then a further 90° with a width of the rest of the plate, such about 30 mm, to provide a folded edge 240. This increases the overall strength of the solar collector unit 2. Furthermore, the folded edges of two neighboring solar collector units may be positioned to abut each other to increase the overall stability of a plant comprising an array of solar collector units. As a further alternative, at least some of the edges of the solar collector unit may be provided with a spoiler 25.

In the embodiments of FIGS. 5 to 9, alternative designs of the solar collector unit 2 are shown. Like reference numerals denote elements having the same or analogous function.

Figure 5:
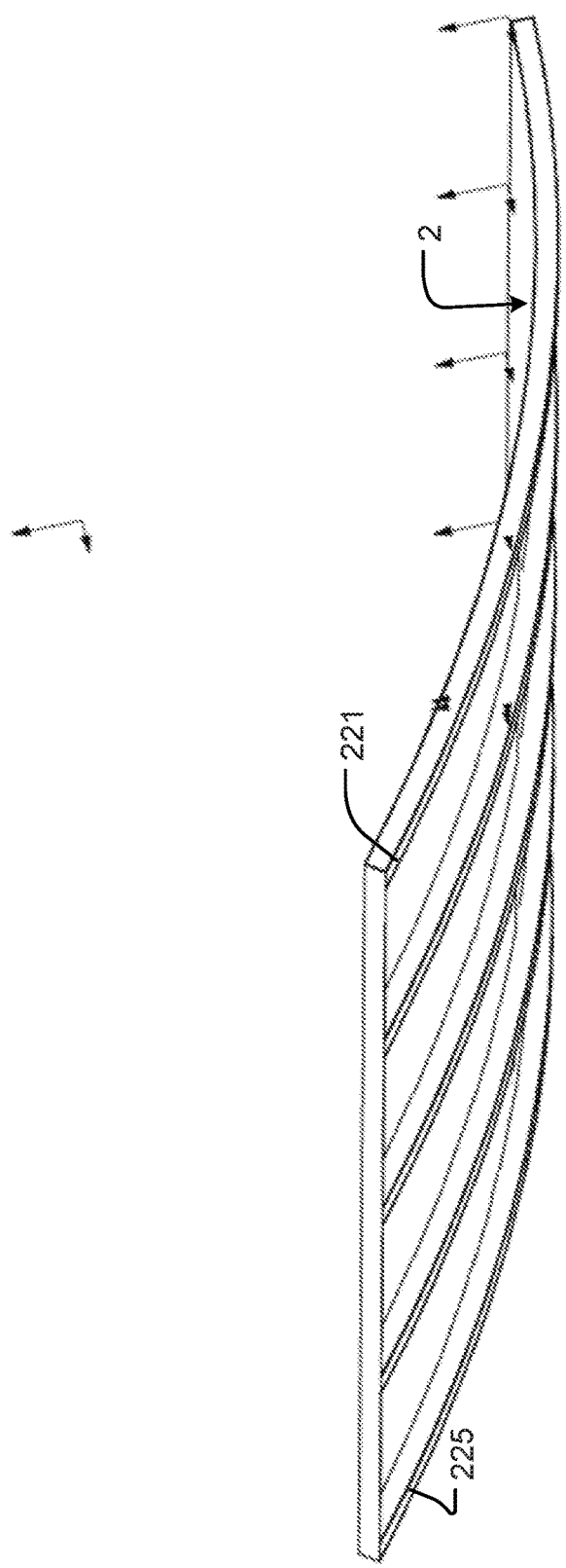
FIG. 5 shows a perspective view of another embodiment of the solar collector unit according to the invention.

Thus, in FIG. 5, five U-shaped profiles are distributed evenly over the length of the solar collector unit 2, of which the outermost two 221 and 225 are shown.

Figure 6:
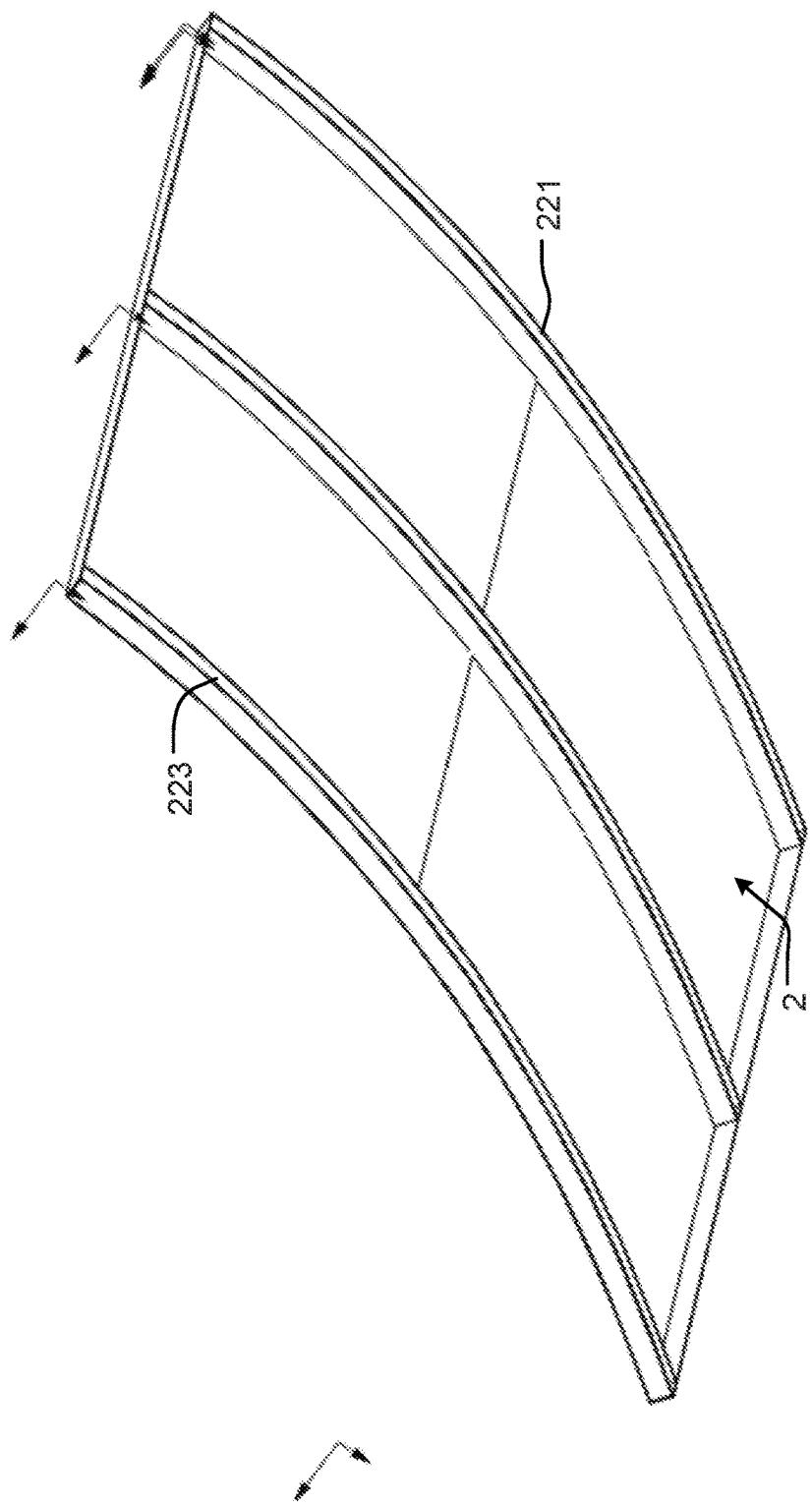
FIGS. 6 to 9 show perspective views of further embodiments of the solar collector unit according to the invention.

Correspondingly, in FIG. 6 three U-shaped profiles 221, 223 are mounted to the support structure of the solar collector unit 2. Thus, in the case the substrate has a length of 2000 mm, the distance d is approximately 1000 mm.

Figure 7:
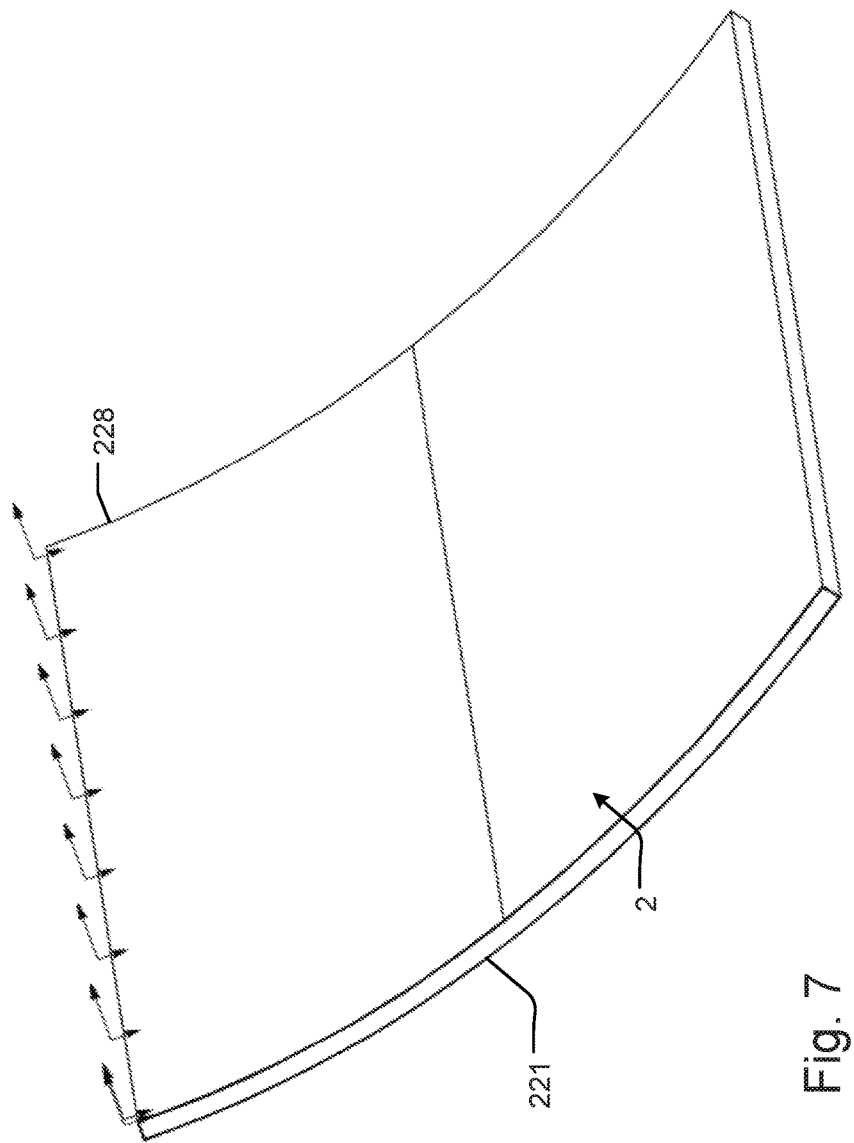

In the embodiment of FIG. 7, the solar collector unit 2 comprises eight such U-shaped profiles of which the outermost two profiles 221 and 228 are shown. Thus, in the case the substrate has a length of 2000 mm, the distance d is approximately 285 mm.

The U-shaped profiles of the embodiments of FIGS. 5 to 6 may be present in other numbers than the ones described and shown in the drawings. Furthermore, the individual character of the profiles may vary in one and the same solar collector unit 2.

Figure 8:
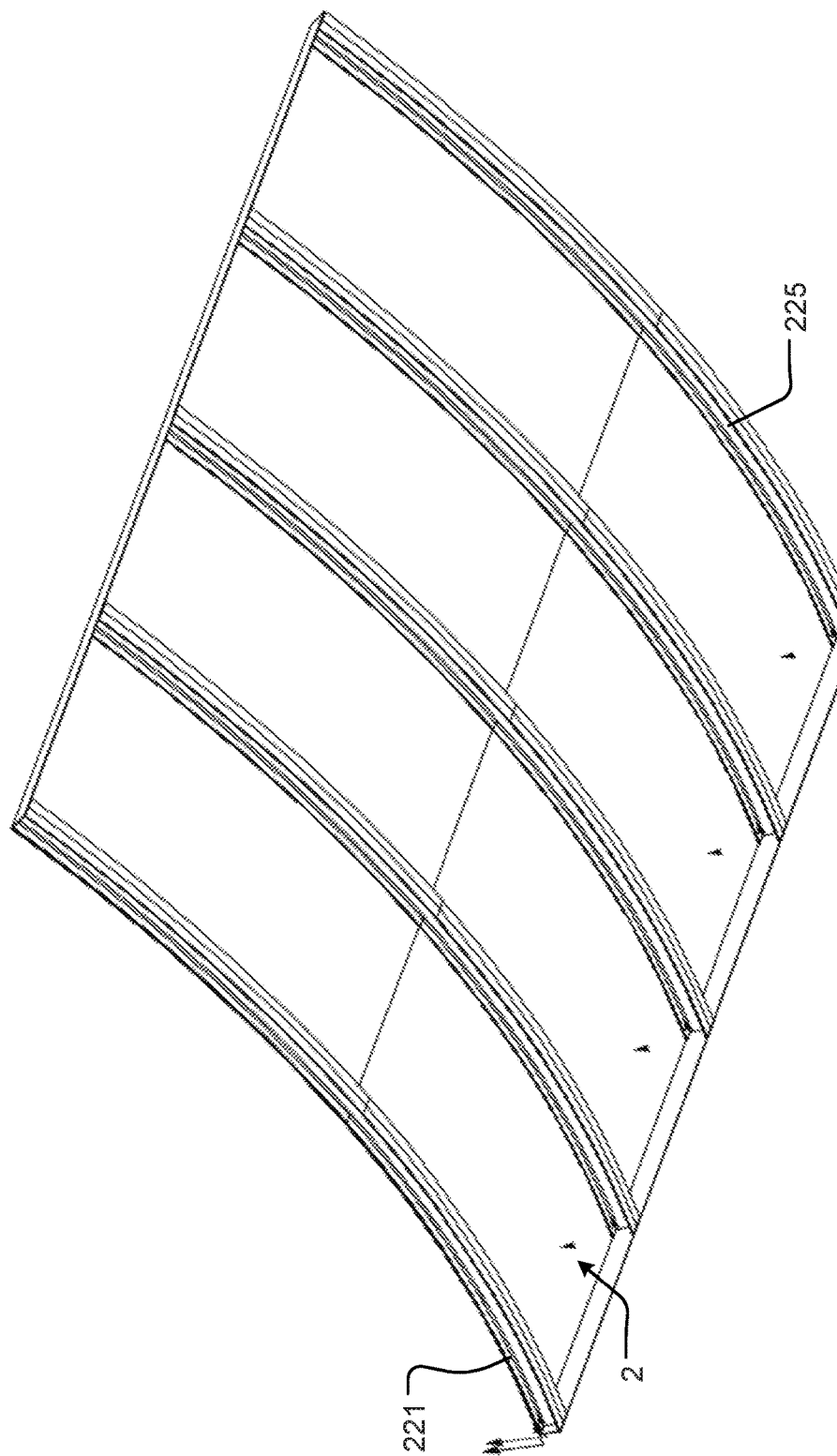

FIG. 8 shows an embodiment, in which five I-shaped profiles (outermost profiles 221 and 225 indicated) are mounted on the support structure of the solar collector unit 2. Obviously, this configuration may be amended to include three, four, six, seven or eight or an even larger number of profiles per solar collector unit 2.

Figure 9:
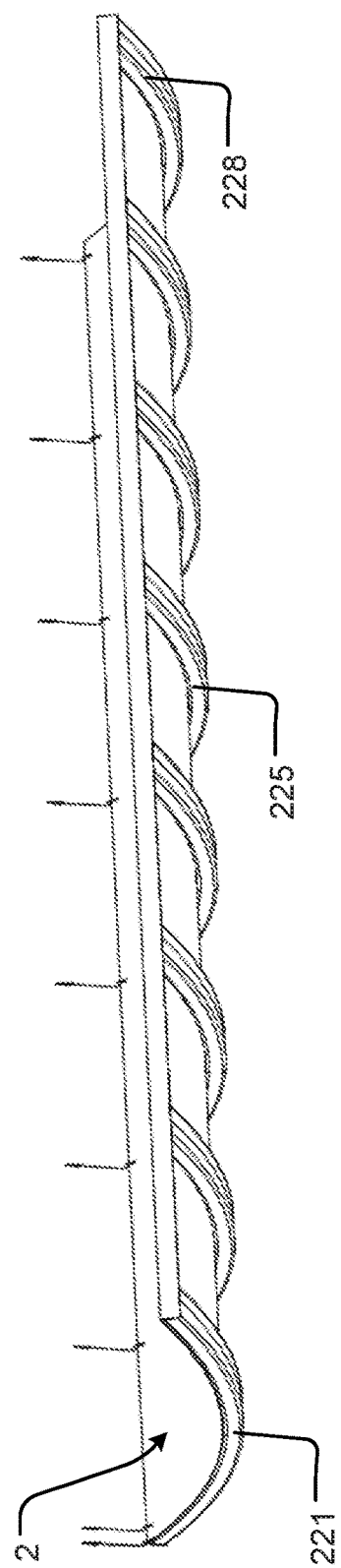

Eventually, in the embodiment shown in FIG. 9, eight rectangular profiles are mounted to a solar collector unit 2. As in the previous embodiments, other numbers and combinations of profiles may be chosen.

FIG. 13 shows a block flow diagram of a test used for selecting the number of predefined number of profiles so as to limit the deflection for a load of 20 kg to less than 25 mm, the method comprising the steps of:

In a step 350, providing a substrate with a length of 2000 mm and a width of 1400 mm. In a step 351, bending each longitudinal or side edge of the substrate 90° with a width of the height of the profile, and then a further 90° with a width of the rest of the plate, such about 30 mm. In a step 352, positioning the solar collector unit in a measuring rig by fixating one longitudinal or side edge and positioning a trestle having a 100 mm diameter underneath a centre of the solar collector unit. In a step 353, loading a corner of the other side edge by a variable force 353. In a step 354, measuring the deflection at the opposite longitudinal or side edge 354.

In the following, manufacture of a solar collector unit 2 according to the invention will be described in detail by means of a number of examples:

EXAMPLE

Blanks of aluminum plate having the dimensions 1500 mm×2000 mm were cut to a substrate having the dimension 1400 mm×2000 mm. Each longitudinal edge of the substrate was bent 90° with a width of 20 mm and then a further 90° with a width of 30 mm to provide a folded edge.

The bent sides of the substrate were attached to a mould by means of a tensioning device. The surface of the plate was cleaned and degreased. Profiles of the kind Prebeam™ 0.15 Alu/1.0 Alu were attached to the plates by 3M™ Scotch-Weld EPX Epoxy Adhesive DP490.

The weight of the individual solar collector unit was as shown in the below Table 1.

TABLE 1

| Thickness of substrate [mm] | Number of profiles | Weight [kg] |
| --- | --- | --- |
| 1 | 5 | 8.5 |
| 1 | 6 | 9.0 |
| 1 | 8 | 9.5 |
| 1.5 | 5 | 11.0 |
| 1.5 | 6 | 11.5 |
| 1.5 | 8 | 12.0 |
| 2 | 8 | 16.0 |

Figure 10:
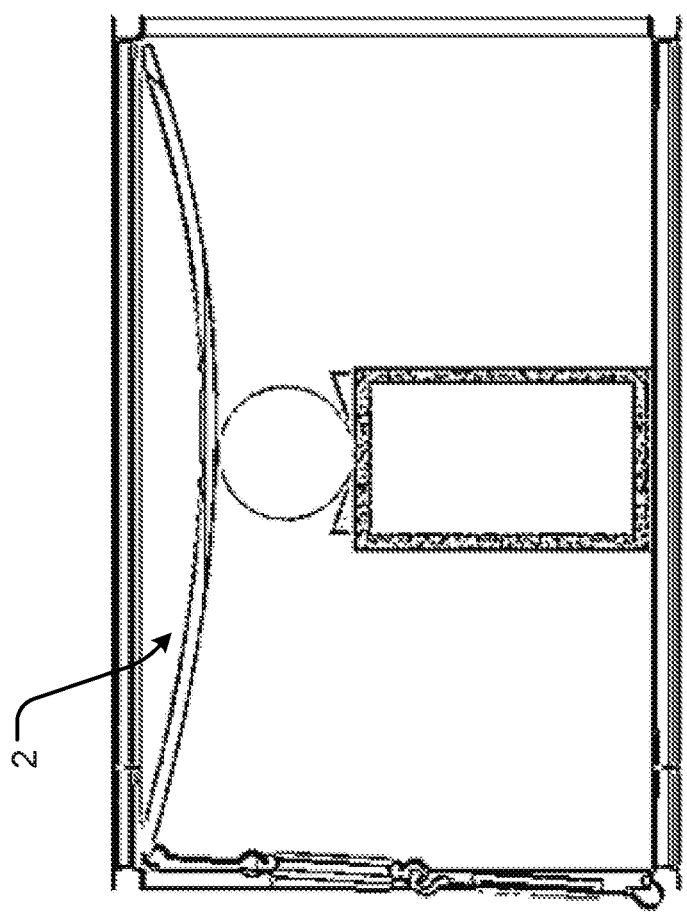
FIGS. 10 to 12 are illustrations of the rig utilized for testing and measuring.
Figure 11:
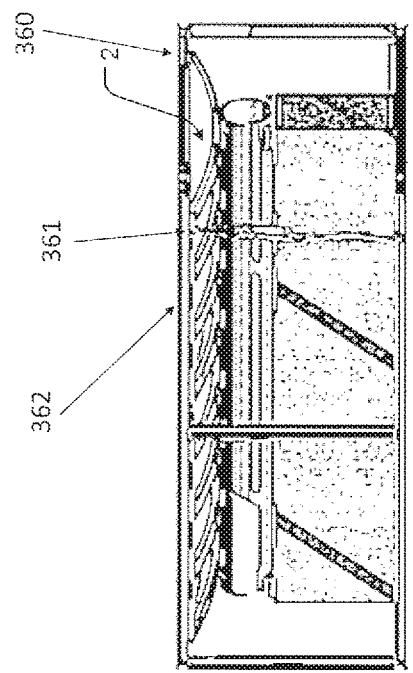
Figure 12:
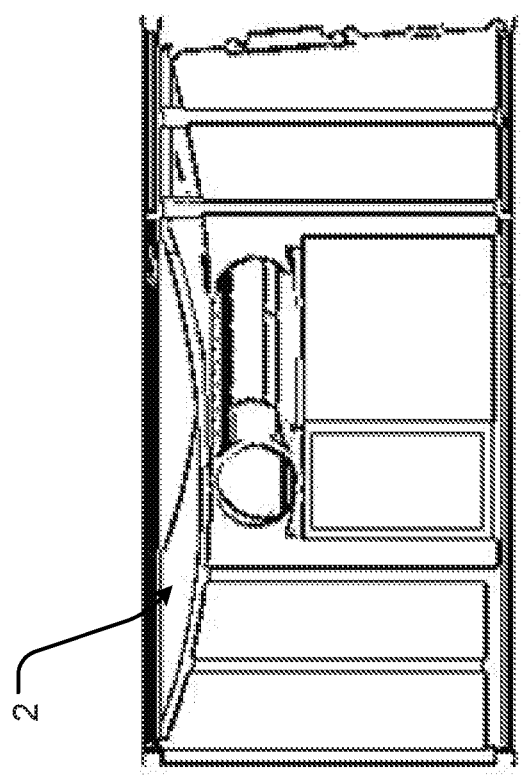

The finished solar collector unit was positioned in a measuring rig, in which one side edge was fixed, while it was resting on a trestle positioned in the centre of the solar collector unit, the trestle having a diameter of 100 mm and the corner of the other side edge was loaded by a variable force and the deflection measured as illustrated in FIGS. 10 to 12. FIG. 11 shows a side edge 360, which is fixed, and a corner of the other side edge 361 loaded by 20 kg and the deflection is measured at the longitudinal edge 362 for measuring the deflection during the test, said deflection is according to embodiments of the invention less than 25 mm at 20 kg of loading.

The tests were carried out for a range of predefined numbers of profiles including 5, 6 and 8, and a thickness of the plate of 1, 1.5 and 2 mm.

The results are shown in the below Table 2.

TABLE 2

|  |  | Loading | | | | | | | | |
|---|---|---|---|---|---|---|---|---|---|---|
|  |  | 5 kg | 10 kg | 15 kg | 20 kg | 25 kg | 30 kg | 35 kg | 40 kg | 50 kg |
| 1 mm/5 Prebeams (wooden) | Deflection of | 7.4 | 17.2 | 24.3 | 30.9 | 42.3 | 53.1 | 68.2 | — | — |
| 1 mm/6 Prebeams | the panels/mm/ | 6.7 | 10.6 | 15.3 | 20.4 | 24.4 | 32.6 | 41.5 | — | — |
| 1 mm/8 Prebeams |  | 5.8 | 10.5 | 14.2 | 19.0 | 22.9 | 29.0 | 35.8 | 39.3 | — |
| 1.5 mm/5 Prebeams |  | 5.6 | 11.5 | 15.3 | 21.7 | 27.1 | 33.8 | 43.3 | 52.8 | — |
| 1.5 mm/6 Prebeams |  | 5.2 | 9.6 | 14.1 | 20.2 | 24.6 | 31.1 | 39.5 | 45.8 | 53.8 |
| 1.5 mm/8 Prebeams |  | 4.5 | 7.0 | 10.7 | 13.4 | 18.4 | 21.7 | 26.5 | 29.5 | 40.2 |
| 2 mm/8 Prebeams |  | 3.8 | 5.1 | 7.7 | 12.0 | 15.1 | 19.1 | 22.8 | 28.4 | 38.5 |

What is claimed is:

1. A method of providing a solar collector unit comprising the steps of:
   providing a substrate,
   providing a reflective surface on the substrate to form a reflector element,
   providing a support structure comprising a predefined number of profiles, followed by the successive steps of:
   adapting the shape of the reflector element, and
   fixing the shape of the reflector element by connecting the support structure to the reflector element;
   wherein the predefined number of profiles is selected so as to limit the deflection for a load of 20 kg to less than 25 mm when the solar collector unit is subjected to a test comprising the steps of:
   providing a substrate with a length of 2000 mm and a width of 1400 mm,
   bending each longitudinal edge of the substrate 90° with a width of the height of the profile, and then a further 90° with a width of the rest of the plate, such about 30 mm,
   positioning the solar collector unit in a measuring rig by fixating one side edge and positioning a trestle having a 100 mm diameter underneath a centre of the solar collector unit,
   loading a corner of the other side edge by a variable force, and
   measuring the deflection at the opposite longitudinal edge.

2. The method of claim 1, wherein the predefined number of profiles is selected in accordance with a length unit of the substrate.

3. A method of providing a solar collector unit comprising the steps of:
   providing a substrate,
   providing a reflective surface on the substrate to form a reflector element,
   providing a support structure comprising a predefined number of profiles, followed by the successive steps of:
   adapting the shape of the reflector element, and
   fixing the shape of the reflector element by connecting the support structure to the reflector element;
   wherein the predefined number of profiles is selected so as to limit the deflection for a load of 20 kg to less than 25 mm when the solar collector unit is subjected to a test comprising the steps of:
   providing a substrate with a length of 2000 mm and a width of 1400 mm,
   bending each longitudinal edge of the substrate 90° with a width of the height of the profile, and then a further 90° with a width of the rest of the plate, such about 30 mm,
   positioning the solar collector unit in a measuring rig by fixating one side edge and positioning a trestle having a 100 mm diameter underneath a centre of the solar collector unit,
   loading a corner of the other side edge by a variable force, and
   measuring the deflection at the opposite longitudinal edge; wherein the bending of each longitudinal edge of the substrate 90° with a width of the height of the profile is about 20 mm and the further bending of 90° with a width of the rest of the plate is about 30 mm.

* * * * *